United States Patent

[11] 3,568,973

| [72] | Inventors | Gerald A. Rau;<br>Le Roy W. Mason, Baraboo, Wis. |
|---|---|---|
| [21] | Appl. No. | 821,238 |
| [22] | Filed | May 2, 1969 |
| [45] | Patented | Mar. 9, 1971 |
| [73] | Assignee | Flambeau Plastics Corporation |

[54] EDGE GATING OF THIN WALL CONTAINERS
4 Claims, 5 Drawing Figs.

[52] U.S. Cl. ............................................. 249/107, 18/42
[51] Int. Cl. ............................................. B29f 1/00
[50] Field of Search ............................................. 249/107, 109, 105

[56] References Cited
UNITED STATES PATENTS

| 1,516,667 | 11/1924 | Bungay | 249/107 |
| 2,836,853 | 6/1958 | Altmann | 18/42 |
| 3,051,994 | 9/1962 | Carozzo | 18/42 |
| 3,428,289 | 2/1969 | Heckrotte et al. | 18/42 |
| 3,443,786 | 5/1969 | Bachner | 18/42 |
| 3,473,197 | 10/1969 | Wilds et al. | 18/42 |
| 3,509,603 | 9/1970 | Halsall et al. | 18/42 |

Primary Examiner—J. Howard Flint, Jr.
Attorney—Molinare, Allegretti, Newitt & Witcoff ABSTRACT: A gating system for molding thin walled, partitioned plastic containers. The container includes a bottom, a pair of sidewalls, and a pair of end walls, a juncture being defined between the bottom and sidewalls. Transverse walls extend between the sidewalls and are spaced intermediate the end walls. First and second spaced sprues are provided. A first pair of gates are spaced opposite each other and introduce plastic into the mold at the juncture between each of the transverse walls or between a transverse wall and each of the end walls. Two runners extend from the first sprue to each of the first pair of gates. A second pair of gates, similar to the first pair of gates, are provided and a second pair of runners, similar to the first pair of runners, extend from the second sprue to each of the second pair of gates.

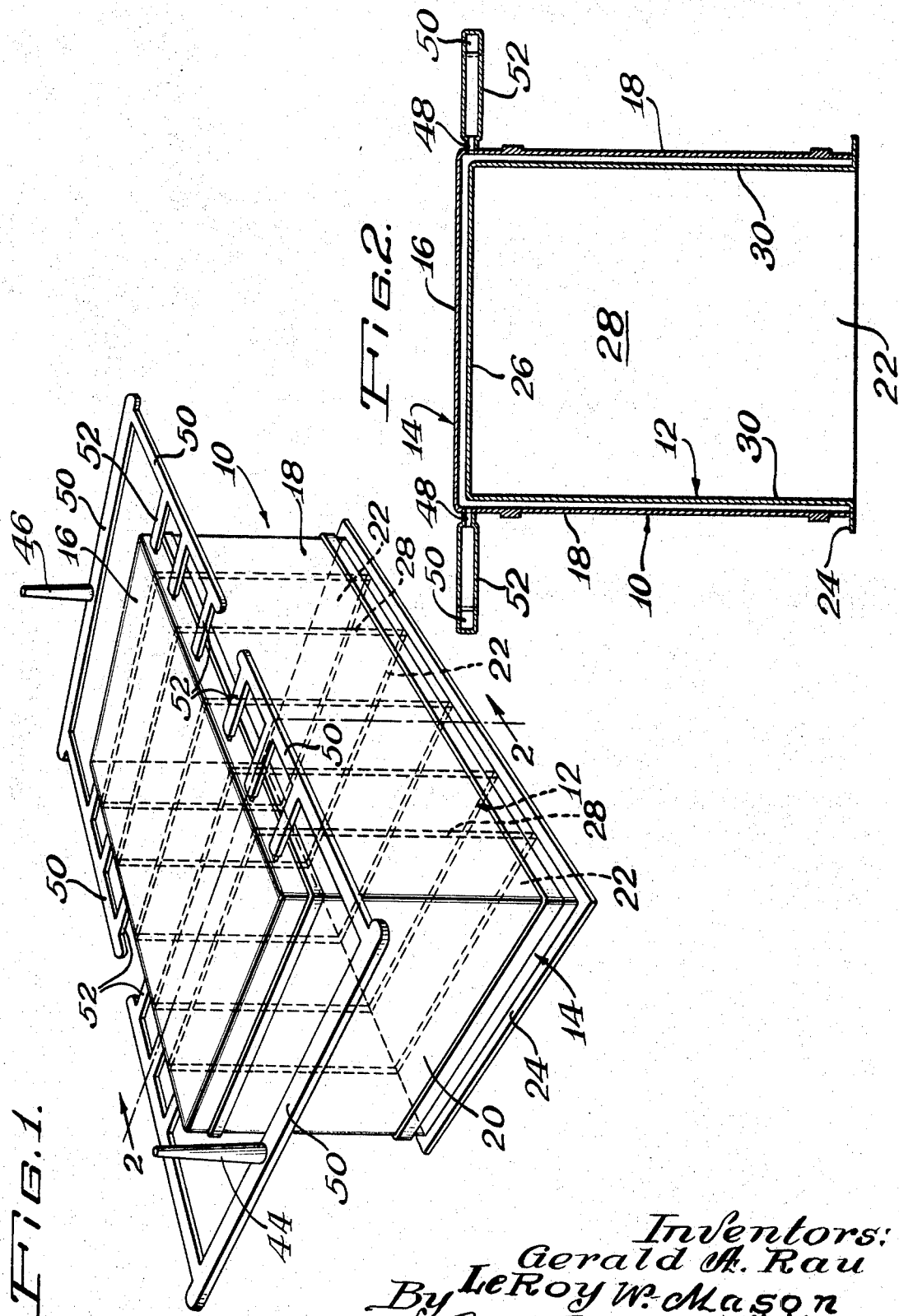

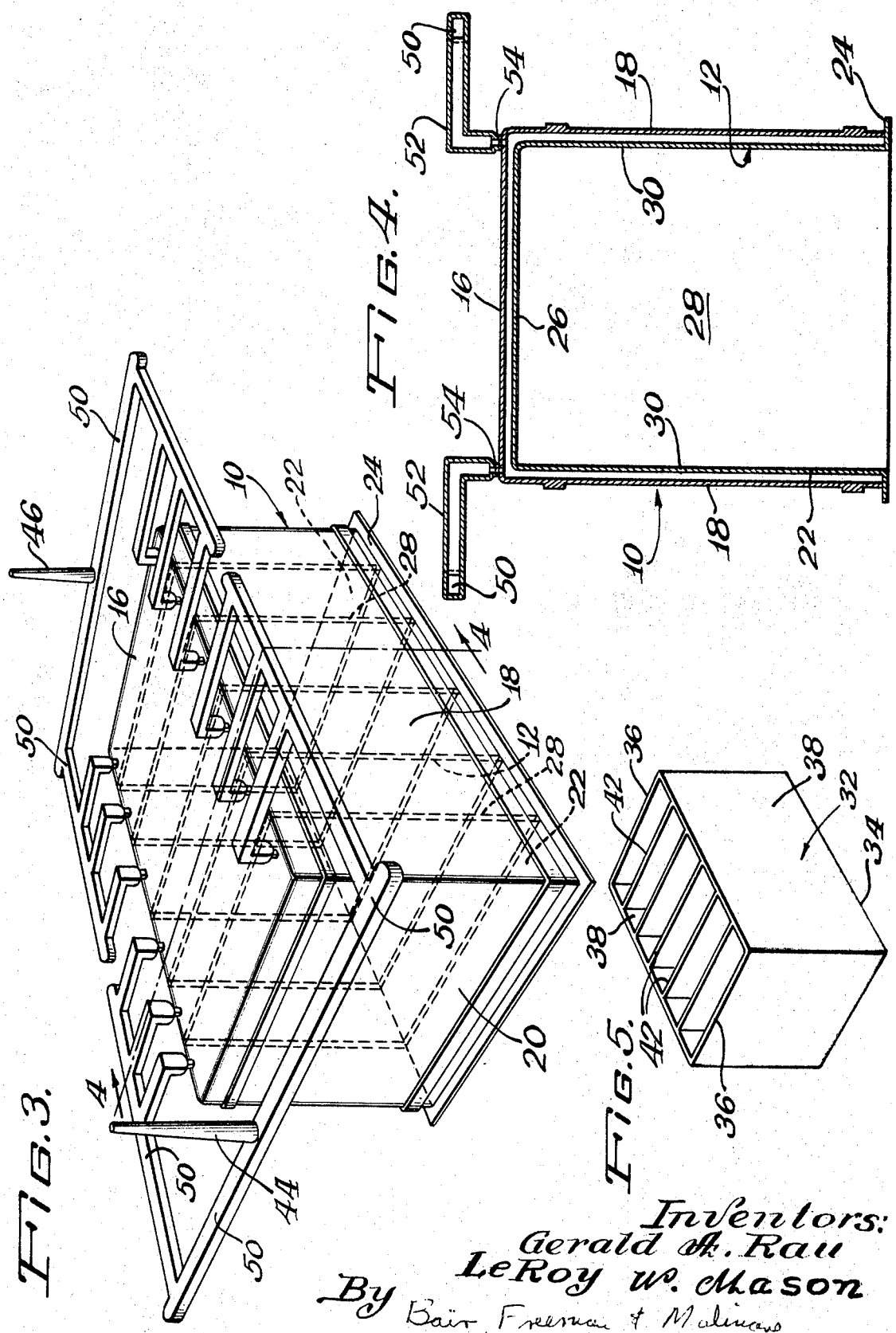

EDGE GATING OF THIN WALL CONTAINERS

BACKGROUND OF THE INVENTION

Field of the Invention And Description of the Prior Art

This invention relates to a gating system for molding plastic containers and it particularly relates to an improved gating system for the molding of thin walled, partitioned plastic containers.

Thin walled partition containers are containers having a bottom wall, a pair of oppositely spaced sidewalls, and a pair of spaced end walls. A plurality of transverse walls extend between the sidewalls and are located intermediate to the end walls. The containers are normally constructed of a plastic material, such as polyethylene, and are of relatively thin walled construction. The molding is done by injection molding with a mold being defined by male and female die halves. A pair of oppositely spaced sidewall sections, a pair of spaced intermediate walls or an end wall and an intermediate wall, and a bottom define a core section. In conventional methods of molding these thin walled, partitioned containers, one center sprue gate is provided for introducing the plastic into the central portion of the bottom of each core section. It is desirable to simultaneously and uniformly fill each core section with plastic material at equal temperature and equal pressure. It is important to have the plastic fill the cavity of each mold under equal temperature and pressure conditions so as to eliminate core deflection and resulting uneven wall thickness.

The problem that has been encountered with the described conventional method is controlled during filling so that the core sections fill at the desired equal rates. In the conventional method, the plastic is fed through a hot runner manifold into each of the individual sprue sections. As mentioned, the control over the temperature and pressure of the plastic to maintain equal flow rates at each of the core sections is critical to having the sprues fill at the same rate. Variations in temperature or pressure vary the fill rate so as to cause one or more of the cores to fill faster, which in turn causes core deflection and product which has uneven wall thickness. Uneven temperature and pressure result in the conventional method.

SUMMARY OF THE INVENTION

It is therefore an important object of this invention to provide a system for the molding of thin walled partitioned plastic containers wherein the temperature and pressure of the plastic is controlled so as to provide a product having substantially even wall thicknesses.

It is also an object of this invention to provide a system for molding a thin walled partitioned plastic container wherein only two sprues are used so as to provide greater control over the temperature and pressure of the plastic being fed to the core sections of the mold, thereby to provide a product of uniform wall thickness.

It is yet another object of this invention to provide an improved gating system for molding thin walled, plastic partitioned containers wherein the plastic material is fed, under substantially uniform temperature and pressure conditions to each core section of the mold.

It is a further object of the invention to provide an improved gating system for molding a thin walled partitioned plastic container wherein the system results in a container having uniform wall thicknesses.

Further purposes and objects of this invention will appear as the specification proceeds.

The foregoing objects are accomplished by providing a gating system for molding a plastic container in a mold wherein the container is the type which includes a bottom, a pair of sidewalls, and a pair of end walls, a juncture being defined between the bottom and the sidewalls, and at least one wall extending between the sidewalls and being spaced intermediate the end walls. The system includes first and second spaced sprues, a first pair of gates oppositely spaced so as to introduce plastic into the mold at the juncture at a position between the intermediate wall and one of the end walls, a first pair of runners extending from the first sprue to each of the first pair of gates, a second pair of gates, oppositely spaced, for introducing plastic into the mold at the juncture at a position between the intermediate wall and the other of said end walls, and a second pair of runners extending from the second sprue to each of the second pair of gates.

BRIEF DESCRIPTION OF THE DRAWINGS

Particular embodiments of the present invention are illustrated in the accompanying drawings wherein:

FIG. 1 is a schematic, pictorial view of our improved gating system for molding thin walled partitioned plastic containers;

FIG. 2 is a cross-sectional view taken along the line 2–2 of FIG. 1 schematically showing the mold and gating system for molding thin walled, partitioned plastic containers;

FIG. 3 is a view similar to FIG. 1 showing an alternate embodiment of our improved gating system for molding thin walled partitioned plastic containers;

FIG. 4 is a cross-sectional view taken along the line 4–4 of FIG. 3 showing in schematic view the internal construction of the mold and runner system; and FIG. 5 is a container made in accordance with new improved gating system.

DESCRIPTION OF THE PREFERRED EMBODIMENTS

Referring to the embodiments of FIGS. 1 and 2, a mold 10 for forming thin walled, partitioned containers is shown. The mold 10 includes a male die portion 12 and a female die portion 14. The dies 12 and 14 are shown schematically for purposes of simplification in description.

The female die 14 includes an upper wall 16, sidewalls 18, and end walls 20. The male die portion 12 includes a plurality of core portions 22 which are interconnected by a lower flange 24. Each core portion 22 includes an upper wall 26, sidewalls 28, and end walls 30. Each of the walls 26, 28 and 30 of the male die 12 are spaced inwardly of the walls 18 and 20 of the female die 14 so as to form a container 32, as shown in FIG. 5, having a desired wall thickness.

The bottom 34 of the container 32 is formed between the upper walls 26 of the male die 12 and the upper wall 16 of the female die 14. The end walls 36 of the container 32 are spaced between the respective end walls 20 of the female die half 14 and the outermost end walls 30 of the outermost core portions 22. The sidewalls 38 of the container 32 are defined between the respective sidewalls 18 of the female die 14 and the sidewalls 28 of the male die 12. A plurality of wall sections 42 are defined between the respective sidewalls 28 of the core portions 22 of the male die 12.

A pair of sprues 44 and 46 are spaced from each other at opposite ends of the mold 10, adjacent the end walls 20 of the female die 14. The sprues 44 and 46 are in substantial alignment and are coaxial with the centerline of the mold 10.

A plurality of openings or gates 48 are provided in the female die 14 in the opposite sidewalls 18 thereof. Each of the gates 48 is spaced intermediate the walls defining each of the core portions 22. In the embodiment shown in FIG. 1, each of the sprues 44 and 46 feeds plastic melt to the opposite sides of three core portions 22. In the embodiment of FIGS. 1 and 2, the gates 48 are in the sidewalls 18 immediately below the juncture between the sidewalls 18 and the upper walls 16 of the female die 14. A runner or manifold 50 extends laterally from each of the sprues 44 and 46 so as to feed plastic melt to each of the gates 48 through runner portions 52 which are connected in parallel to the manifold 50.

Referring to the embodiment of FIGS. 3 and 4, the mold 10 is of substantially the same construction as that shown in the embodiment of FIGS. 1 and 2. However, the gates 54 in the embodiment of FIGS. 3 and 4 are located in the upper wall 16 of the female die 14. The gates 54 are spaced laterally inwardly of the juncture between the upper walls 16 and the sidewalls 18. In other respects, the embodiment of FIGS. 3 and 4 are substantially the same as that in the embodiment of FIGS. 1 and 2 and includes spaced sprues 44 and 46 and runners 50, including the parallel connected runner portions 52.

In each of the embodiments thus described, the plastic melt is fed into only two sprues rather than to a sprue for each of the core sections. By this technique, greater temperature and pressure control is provided over the plastic melt. Also, by feeding the plastic melt to each of the core sections at the juncture between the sidewalls and bottoms thereof, the plastic melt flows downwardly along the corner or juncture of each of the core sections rather than from the central portion thereof. In this way, the plastic melt has less distance to run, resulting in greater control over the temperature and pressure of the melt. The combination of the reduced number of sprues, and plurality of gates interconnected to the sprues by runners, provides the advantage resulting from the invention.

The plastic melt feeds from opposite directions to each of the core sections. In contrast to the prior art method of feeding from the central portion of each of the cores, the plastic has less distance to run with less opportunity for the plastic to cool, resulting in undesired temperature variation. The gating technique described herein results in a container, as shown in FIG. 5, of substantially uniform wall thickness throughout.

While in the foregoing there has been provided a detailed description of particular embodiments of the present invention, it is to be understood that all equivalents obvious to those having skill in the art are to be included within the scope of the invention as claimed.

We claim:
1. A gating system for molding a plastic container in a mold wherein the container has a bottom, a pair of sidewalls, and a pair of end walls, a juncture being defined between said bottom and said sidewalls, and at least one transverse wall between said sidewalls and spaced intermediate said end walls, said system comprising, in combination, first and second spaced sprues, a first pair of gates oppositely spaced for introducing plastic into said mold at said juncture at a position between said intermediate wall and one of said end walls, a first pair of runners extending from said first sprue to each of said first pair of gates, a second pair of gates oppositely spaced for introducing plastic into said mold at said juncture at a position between said intermediate wall and the other of said end walls, and a second pair of runners extending from said second sprue to each of said second pair of gates.

2. The system of claim 1 wherein each of said gates introduces plastic into said mold in said sidewalls adjacent said juncture.

3. The system of claim 1 wherein each of said gates introduces said plastic into said mold in said bottom adjacent said juncture.

4. The system of claim 1 wherein a plurality of spaced and transverse walls extend between said sidewalls and intermediate said end walls, and a pair of said gates are oppositely spaced for introducing plastic into said molds at said juncture at a position between said end wall and one of said intermediate walls and between each of said intermediate walls, and said runners be interconnected in parallel to each of said gates.

UNITED STATES PATENT AND TRADEMARK OFFICE
Certificate

Patent No. 3,568,973                                           Patented March 9, 1971

Gerald A. Rau and Le Roy W. Mason

Application having been made by Gerald A. Rau and Le Roy W. Mason, the inventors named in the patent above identified, and Flambeau Plastics Corporation, the assignee, for the issuance of a certificate under the provisions of Title 35, Section 256, of the United States Code, adding the name of Walter R. Lovejoy as a joint inventor, and a showing and proof of facts satisfying the requirements of the said section having been submitted, it is this 11th day of November 1975, certified that the name of the said Walter R. Lovejoy is hereby added to the said patent as a joint inventor with the said Gerald A. Rau and Le Roy W. Mason.

*Associate Solicitor.*